(12) United States Patent
Shen et al.

(10) Patent No.: US 11,574,001 B2
(45) Date of Patent: Feb. 7, 2023

(54) METHOD AND APPARATUS FOR GENERATING UNORDERED LIST, METHOD FOR MANAGING IMAGES AND TERMINAL DEVICE

(71) Applicant: BOE Technology Group Co., Ltd., Beijing (CN)

(72) Inventors: Yan Shen, Beijing (CN); Mingyuan Ma, Beijing (CN); Tailiang Li, Beijing (CN); Shuo Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/352,311

(22) Filed: Jun. 20, 2021

(65) Prior Publication Data
US 2022/0207075 A1 Jun. 30, 2022

(30) Foreign Application Priority Data
Dec. 25, 2020 (CN) .......................... 202011564913.8

(51) Int. Cl.
*G06F 16/30* (2019.01)
*G06F 16/51* (2019.01)
(Continued)

(52) U.S. Cl.
CPC ............ *G06F 16/51* (2019.01); *G06F 16/535* (2019.01); *G06F 16/538* (2019.01)

(58) Field of Classification Search
CPC ...... G06F 16/51; G06F 16/538; G06F 16/535; G06F 7/76
See application file for complete search history.

(56) References Cited

U.S. PATENT DOCUMENTS

2007/0038669 A1* 2/2007 Davis ...................... G06F 16/41
2008/0281867 A1* 11/2008 Kendall ................ G11B 27/034
(Continued)

FOREIGN PATENT DOCUMENTS

| CN | 112699262 A | * | 4/2021 | |
| EP | 2469882 A2 | * | 6/2012 | ....... G06F 17/30053 |
| KR | 2008041903 A | * | 5/2008 | |

OTHER PUBLICATIONS

Article entitled "Fisher-Yates-Durstenfeld Shuffle", by Carr, dated Jan. 2, 2013 (Year: 2013).*

*Primary Examiner* — Mahesh H Dwivedi
(74) *Attorney, Agent, or Firm* — Ipro, PLLC (57) ABSTRACT

A method and apparatus for generating an unordered list, a method for managing images and a terminal device are disclosed. The method for generating the unordered list includes: randomly acquiring a first element from an ordered list and inserting the first element into the unordered list; cycling the execution of the following steps in a case where a number of current elements in the unordered list is smaller than a sum of elements in the ordered list: determining whether a position at which the first element is located is an edge position in the ordered list and randomly acquiring a second element from the ordered list based on a determining result, and randomly acquiring a target position from the unordered list and inserting the second element into the target position in the unordered list; and ending the cyclic execution in a case where the number of the elements in the unordered list is equal to the sum of the elements in the ordered list.

8 Claims, 5 Drawing Sheets

(51) Int. Cl.
    *G06F 16/538* (2019.01)
    *G06F 16/535* (2019.01)

(56) References Cited

U.S. PATENT DOCUMENTS

2011/0066633 A1* 3/2011 Naftolin .............. G06F 16/4387
                                                707/769
2012/0158531 A1* 6/2012 Dion .................... H04N 21/632
                                                705/26.1

* cited by examiner

METHOD AND APPARATUS FOR GENERATING UNORDERED LIST, METHOD FOR MANAGING IMAGES AND TERMINAL DEVICE

CROSS REFERENCE TO RELEVANT APPLICATIONS

The present disclosure claims priority to Chinese Patent Application No. 202011564913.8, filed on Dec. 25, 2020 and entitled "METHOD AND APPARATUS FOR GENERATING UNORDERED LIST, METHOD FOR MANAGING IMAGES AND TERMINAL DEVICE", which is incorporated in the disclosure by reference in its entirety.

TECHNICAL FIELD

The disclosure relates to the field of display technologies, and in particular, relates to a method and apparatus for generating an unordered list, a method for managing images and a terminal device.

BACKGROUND

Since wallpaper carousel can bring a richer visual experience to users, most terminal devices are provided with a wallpaper carousel function. In a traditional fashion of wallpaper carousel, wallpapers are extracted from a database for playback.

SUMMARY

The disclosure provides a method and apparatus for generating an unordered list, a method for managing images and a terminal device.

An embodiment of the present disclosure discloses a method for generating an unordered list, comprising:

randomly acquiring a first element from an ordered list and inserting the first element into an unordered list;

cycling the execution of the following steps in a case where a number of current elements in the unordered list is smaller than a sum of elements in the ordered list:

determining whether a position at which the first element is located is an edge position in the ordered list and randomly acquiring a second element from the ordered list based on a determining result;

randomly acquiring a target position from the unordered list, and inserting the second element into the target position in the unordered list; and ending the cyclic execution in a case where the number of the elements in the unordered list is equal to the sum of the elements in the ordered list, wherein when determining whether the position where the first element is located is the edge position in the ordered list during the cyclical executing, a position, at which the second element is located in the ordered list and which is randomly acquired last time, is taken as the position at which the first element is located in the ordered list.

In an embodiment, the step of determining whether the position at which the first element is located is the edge position in the ordered list and randomly acquiring the second element from the ordered list based on the determining result comprises:

determining whether the position at which the first element is located is the edge position in the ordered list, and if the position at which the first element is located is not the edge position in the ordered list, acquiring two second elements respectively from the ordered list before and after the first element by using a recursive algorithm, wherein the two second elements are located between a previous element of the first element in the ordered list and the first element in the ordered list and between a next element of the first element and a last element in the ordered list, respectively.

In an embodiment, the step of determining whether the position at which the first element is located is the edge position in the ordered list and randomly acquiring the second element from the ordered list based on the determining result comprises:

determining whether the position at which the first element is located is the edge position in the ordered list, and if the position at which the first element is located is the edge position in the ordered list, acquiring one second element from the ordered list, wherein when the first element is located at a first element position in the ordered list, the second element is acquired between a last element in the ordered list and a next element of the first element; or when the first element is located at a last element position in the ordered list, the second element is acquired between the first element in the ordered list and a previous element of the first element.

In an embodiment, the step of acquiring the first element from the ordered list and inserting the first element into the unordered list comprises:

acquiring a random position from the ordered list based on a first random function, and inserting an element corresponding to the random position into the unordered list.

In an embodiment, the step of acquiring the target position from the unordered list comprises:

acquiring the sum of all the current elements in the unordered list, and acquiring the target position in the unordered list based on a second random function and the sum of all the current elements in the unordered list.

In an embodiment, the step of acquiring the target position in the unordered list based on the second random function and the sum of all the current elements in the unordered list comprises:

adding 1 to the sum of all the current elements in the unordered list, and acquiring the target position in the unordered list based on the second random function.

In an embodiment, the unordered list has a chain-type storage structure.

A method for managing images is further provided, comprising:

acquiring N frames of images to be played, with N>1; and generating an unordered list for image playback based on the N frames of images by using the method for generating the unordered list, and randomly playing the images based on the unordered list for image playback.

In an embodiment, the method further comprising an operation of performing automatic deletion on the images, wherein the operation of automatic deletion comprises:

receiving configuration parameters of the images;

acquiring, based on the configuration parameters, a storage weight corresponding to each of the configuration parameters and a download time corresponding to each of the configuration parameters;

acquiring a total storage weight of the images based on the configuration parameters, the storage weight and the download time; and deleting the images in a predefined time period in response to the total storage weight reaching a predefined threshold.

In an embodiment, the configuration parameters comprise at least one of: images downloaded by a local user, images preferred by the local user, images downloaded by an on-line user, images preferred by the on-line user and images selected by a user.

In an embodiment, the acquiring, based on the configuration parameters, the storage weight corresponding to each of the configuration parameters and the download time corresponding to each of the configuration parameters comprises: acquiring a field attribute of each of the configuration parameters, and acquiring, based on the field attributes, the storage weight corresponding to each of the configuration parameters and the download time corresponding to each of the configuration parameters.

In an embodiment, acquiring the total storage weight of the images based on the configuration parameters, the storage weights and the download time comprises: computing the total storage weight of the images by the following formula:

$$Y(x)=a_1*X_1/t_1+a_2*X_2/t_2+a_3*X_3/t_3+a_4*X_4/t_4+a_5*X_5/t_5 \ldots a_n*X_n/t_n,$$

wherein $Y(x)$ represents the total storage weight; $X_1$, $X_2$, $X_3$, $X_4$, $X_5$, ..., $X_n$ represent each of the configuration parameters respectively; $a_1$, $a_2$, $a_3$, $a_4$, $a_5$, ..., $a_n$ represent the storage weight corresponding to each of the configuration parameters respectively; $t_1$, $t_2$, $t_3$, $t_4$, $t_5$, ..., $t_n$ represent the download time corresponding to each of the configuration parameters; and n is more than or equal to 1.

In an embodiment, wherein before acquiring, based on the configuration parameters, the storage weight corresponding to each of the configuration parameters and the download time corresponding to each of the configuration parameters, the method further comprises:

no longer computing the total storage weight within a predefined time in response to detecting that the images are set to "never delete".

A terminal device is further provided, comprising a memory and a processor, wherein the memory is configured to store one or more computer instructions, wherein the one or more computer instructions are executed by the processor to implement the method for generating the unordered list.

A display system is further provided, comprising a display device, wherein the display device comprises a display panel, a memory and a processor; and the memory is configured to store one or more computer instructions, wherein the one or more computer instructions, when executed by the processor, implement the method for generating the unordered list.

A computer-readable storage medium storing a computer program therein is further provided, wherein the computer program, when executed by a processor, implements the method for generating the unordered list.

A terminal device is provided, comprising a memory and a processor, wherein the memory is configured to store one or more computer instructions, wherein the one or more computer instructions are executed by the processor to implement the method for managing the images for image management.

A display system is provided, comprising a display device, wherein the display device comprises a display panel, a memory and a processor; and the memory is configured to store one or more computer instructions, wherein the one or more computer instructions, when executed by the processor, implement the method for managing the images.

A computer-readable storage medium storing a computer program therein is provided, wherein the computer program, when executed by a processor, implements the method for managing the images.

The description above only provides an overview of the technical solutions of the disclosure. The following enumerates specific embodiments of the disclosure for a clearer understanding of the technical means of the disclosure so as to practice it in accordance with the specification, and for a clearer understanding of the above and other objects, features and advantages of the disclosure.

BRIEF DESCRIPTION OF THE DRAWINGS

For clearer descriptions of the technical solutions in the embodiments of the disclosure and in the related art, the following briefly introduces the accompanying drawings required for describing the embodiments or the related art. Apparently, the accompanying drawings in the following description show some embodiments of the disclosure, and a person of ordinary skill in the art may still derive other drawings from these accompanying drawings without creative efforts.

DETAILED DESCRIPTION

The technical solutions in the embodiments of the disclosure will be described clearly and completely below with reference to the accompanying drawings in the embodiments of the present invention. Obviously, the embodiments described are merely some instead of all of the embodiments of the disclosure. Based on the embodiments of the disclosure, all other embodiments obtained by a person of ordinary skill in the art without creative work shall fall within the protection scope of the disclosure.

Figure 1:
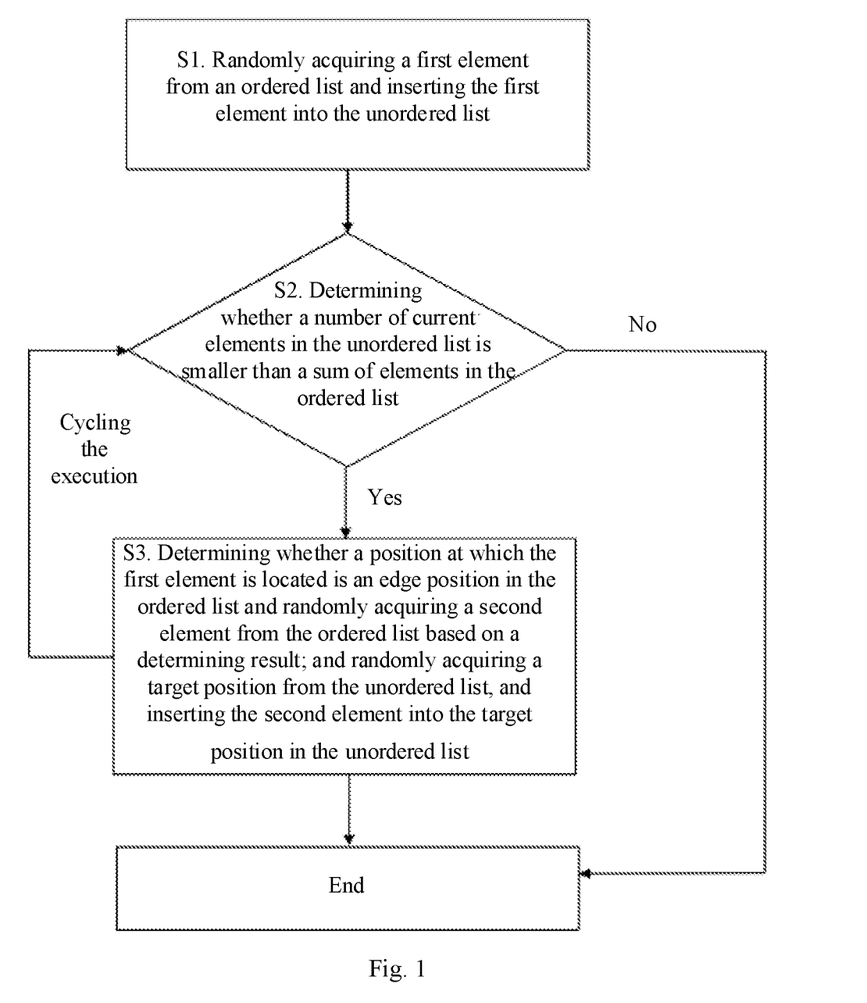
FIG. 1 illustrates a flowchart of a method for generating an unordered list according to an embodiment of the disclosure.

FIG. 1 illustrates a flowchart of a method for generating an unordered list according to an embodiment of the disclosure.

This embodiment provides a method for generating an unordered list. With reference to FIG. 1, the method for generating the unordered list includes the following steps.

In step S1, a first element is randomly acquired from an ordered list, and is inserted into the unordered list.

A method for randomly acquiring the first element from the ordered list and inserting the first element into the unordered list includes: acquiring a random position from the ordered list based on a first random function, and inserting an element corresponding to the random position into the unordered list. In an embodiment, an original ordered list includes five elements of 1, 2, 3, 4, 5, wherein the element 1 is located at a position 1, the element 2 is located at a position 2, the element 3 is located at a position 3, an element 4 is located at a position 4 and an element 5 is located at a position 5. As can be concluded by analyzing the original ordered list, the original ordered list includes five elements and five positions. An arbitrary random integer value in a sequence from 1 to 5 is generated by using a random function Radom (1, 5). Assuming a generated arbitrary random number p=3, the random position acquired from the ordered list based on the first random function is the position 3, and the element 3 corresponding to the position 3 is added to the unordered list list_1.

In step S2, whether a position at which the first element is located is an edge position in the ordered list is determined based on the fact that the number of the current elements in the unordered list is smaller than a sum of the elements in the ordered list; and a second element is randomly acquired from the ordered list based on a determining result.

The explanation is made based on step S1 as follows: when the element 3 corresponding to the position 3 is added to the unordered list list_1, the number of current elements in the unordered list list_1 is sum(sum=1), and the sum of the elements in the ordered list is 5. With 1 smaller than 5, it indicates that the number of the current elements in the unordered list is smaller than the sum of the elements in the ordered list, and step S2 is executed.

Whether the position at which the first element is located in the ordered list is the edge position is determined. If the position at which the first element is located is not the edge position in the ordered list, two second elements are acquired respectively from the ordered list before and after the first element by using a recursive algorithm, wherein the two second elements are located between the first element and a previous element of the first element in the ordered list and between a last element and a next element of the first element in the ordered list, respectively. If the position at which the first element is located is the edge position in the ordered list, one second element is acquired from the ordered list, wherein when the first element is located at a first element position in the ordered list, the second element is acquired from the ordered list between the last element and the next element of the first element; or when the first element is located at a last element position in the ordered list, the second element is acquired between the first element and the previous element of the first element in the ordered list.

The explanation is made based on step S1 as follows: a first element 3 is acquired from the ordered list; with 3 located at the position 3 in the ordered list, a determining result is that the position at which the first element 3 is located is not at the edge position of the ordered list; and then, two second elements are acquired from the ordered list by using the recursive algorithm, wherein one second element is selected between 1 and 2 (including 1 and 2), and the other second element is selected between 4 and 5 (including 4 and 5). If a first element 1 is acquired from the ordered list; with 1 located at the position 1 in the ordered list, a determining result is that the position at which the first element 1 is located is at the edge position (first element position) in the ordered list; and then one second element is selected between 2 and 5 (including 2 and 5). If the first element 5 is acquired from the ordered list; with 5 located the position 5 in the ordered list, a determining result is that the position at which the first element 5 is located is at the edge position (the last element position) in the ordered list, and then one second element is acquired between 1 and 4 (including 1 and 4).

In step S3, a target position is randomly acquired from the unordered list, and the second element is inserted into the target position in the unordered list.

A method for randomly acquiring the target position from the unordered list includes: acquiring the sum of all the current elements in the unordered list, and acquiring the target position in the unordered list based on a second random function and the sum of all the current elements in the unordered list. 1 is added to the sum of all the current elements in the unordered list; then, the target position in the unordered list is acquired based on the second random function; and then, the second element is inserted into the target position in the unordered list. The explanation is made based on steps S1 to S2 as follows: a first element 3 is acquired from the ordered list and inserted into the unordered list list_1; here the sum of all the elements in the unordered list list_1 is sum(sum=1); 1 is added to the sum of the elements, i.e., sum(sum=2); then, a random number x=Radom(1,2) is solved for the sum of 2 of the unordered list list_1; assuming x=1, a generated random number 1 is the target position, that is, the second element is inserted into the first position in the unordered list list_1; and assuming x=2, a generated random number 2 is a target position, that is, the second element is inserted into the second position in the unordered list list_1. The first element 3 is acquired from the ordered list; with 3 located at the position 3, a determining result is that the position at which the first element 3 is located is not at the edge position in the ordered list; and then, two second elements are acquired from the ordered list by using the recursive algorithm, wherein one second element is acquired from the ordered list between 1 and 2 (including 1 and 2), thereby obtaining 2 as the second element. Here, the sum of all the elements in the unordered list list_1 is sum(sum=1), and 1 is added to the sum, i.e., sum(sum=2); then a random number x=Radom(1,2) is solved for the sum of 2 of the unordered list list_1; and assuming x=1, a generated random number 1 is the target position, that is, 2 is inserted into the first position in the unordered list list_1, thereby obtaining the unordered list list_1 as 2, 3. The other second element is acquired from the ordered list between 4 and 5 (including 4 and 5), thereby obtaining 4 as the second element. Here, the sum of all the elements in the unordered list list_1 is sum(sum=2), and 1 is added to the sum, i.e., sum(sum=3); then a random number x=Radom(1,3) is solved for the sum of 3 of the unordered list list_1; and assuming x=2, a generated random number 2 is the target position, that is, 4 is inserted into the second position in the unordered list list_1, thereby obtaining the unordered list list_1 as 2, 4, 3.

In step S4, the first element in the foregoing three steps is substituted with the inserted second element; the foregoing three steps are cyclically executed till the number of the elements in the unordered list is equal to the sum of the elements in the ordered list; whether the position at which the first element is located is the edge position in the ordered list is determined during the cyclic executing; and a position of the second element, randomly acquired last time, in the ordered list is taken as the position of the first element in the ordered list. That is, when inserting the second element into the target position in step S3 is completely executed, whether the number of the current elements in the unordered list is smaller than the sum of the elements in the ordered list is determined; if the number of the current elements in the unordered list is smaller than the sum of the elements in the ordered list, the second element is taken as the first element in step S2; whether the position at which the first element is located is the edge position in the ordered list is determined; a new second element is randomly acquired from the ordered list based on a determining result; a target position is randomly acquired from the unordered list; and the acquired new second element is inserted into the target position in the unordered list.

By taking the second element as the first element, if it is not at the edge position in the ordered list, two second elements are acquired again respectively from the ordered list before and after the first element by using the recursive algorithm, wherein the two second elements are located between a previous element of the first element and the first element in the ordered list and between a next element of the first element and a last element in the ordered list, respectively. By taking the second element as the first element, if it is not at the edge position in the ordered list and when the first element is located at the first element position in the ordered list, the second element is acquired between the last element and the next element of the first element, in the ordered list; or when the first element is at a last element position in the ordered list, the second element is acquired between the first element and the previous element of the first element in the ordered list.

In an embodiment, assuming that the ordered list is 1, 2, 3, 4, 5, a first element 3 is acquired from the ordered list and then inserted into the unordered list; and here, it is determined that the number (1) of the elements in the unordered list is smaller than the sum (5) of the elements in the ordered list, and determined that the first element 3 is not at the edge position in the ordered list. Then, a second element 2 is acquired from the ordered list between the previous element 2 of the first element 3 and the first element 1; a target position 1 is acquired from the unordered list; and the second element 2 is inserted into the position 1 in the unordered list, thereby forming the unordered list_1, 3. A second element 5 is acquired from the ordered list between the next element of the first element 3 and the last element 5; a target position 2 is acquired from the unordered list; and the second element 5 is inserted into the position 2 in the unordered list, thereby forming the unordered list_1, 5, 3. Or, one second element 2 is acquired from the ordered list between the previous element of the first element 3 and the first element 1; one second element 5 is acquired from the ordered list between the next element of the first element 3 and the last element 5; two target positions 1 and 2 are acquired from the unordered list; and the second elements 2 and 5 are simultaneously inserted into the target positions 1 and 2 in the unordered list, thereby forming the unordered list_1, 5, 3. Here, the number of the current elements in the unordered list is 3 which is smaller than the sum 5 of the elements in the ordered list; and then, by taking the second elements 2 and 5 as the first element in step S2 respectively, data insertion is continuously performed on the unordered list. Here, the first element 2 is not at the edge position of the ordered list, and only the element 1 is remained before the first element 2 in the ordered list; the element 1 is acquired as the second element, and the target position 1 is acquired in the unordered list; and the second element 1 is inserted into the position 1 in the unordered list to form the unordered list 2, 1, 5, 3. If only the element 4 is remained after the first element 2 in the ordered list, the element 4 is acquired as the second element; the target position 2 is acquired in the unordered list; and the second element 4 is inserted into the position 1 in the unordered list to form the unordered list 2, 4, 1, 5, 3. Here, the number of the current elements in the unordered list is 5 which is equal to the sum 5 of the elements in the ordered list, and the step of cycling is ended.

After cycling the execution of the steps above, the elements in the unordered list increase, so the number of the current elements in the unordered list increases constantly till the number of the elements in the unordered list is equal to the sum of the elements in the ordered list. Then, the unordered arrangement of all the elements is completed to form the complete unordered list. Therefore, the execution of the steps of the method is ended.

Optionally, the unordered list has a chain-type storage structure. The unordered list of the chain-type storage structure may prevent the resource consumption caused by sequential storage; and a certain node may be arbitrarily inserted and deleted, leading to high access efficiency.

It should be understood that although the method is described in an order of the steps in the embodiment described above, it should not be understood that the method can be implemented only in the above order of steps. The numbering of the steps in the method is not intended to limit the execution order of these steps, and other steps may be added among respective steps. The execution order of steps S1 to S4 is not specifically defined in the embodiments of the disclosure.

With the method for generating the unordered list in this embodiment, a generation process is simple and fast, and no repeated element appear in the generated unordered list.

Figure 2:
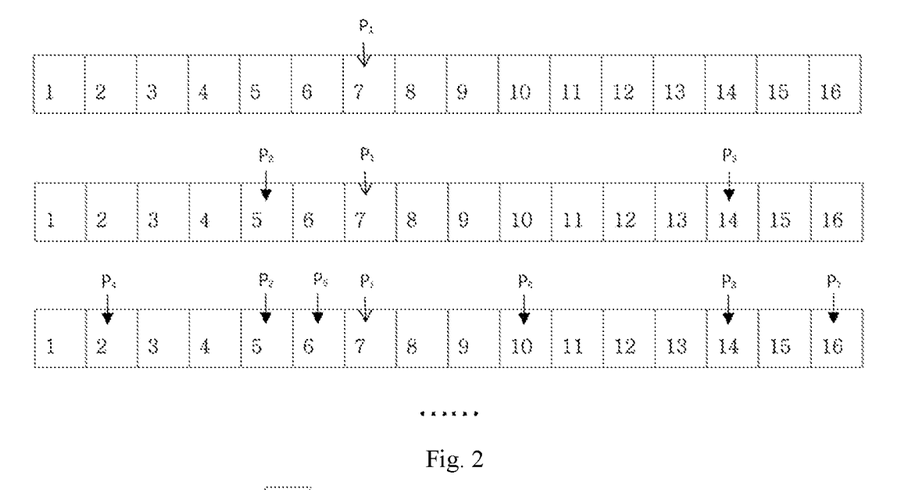
FIG. 2 illustrates a schematic diagram of a process of acquiring an element in an unordered list according to an embodiment of the disclosure.
Figure 3:
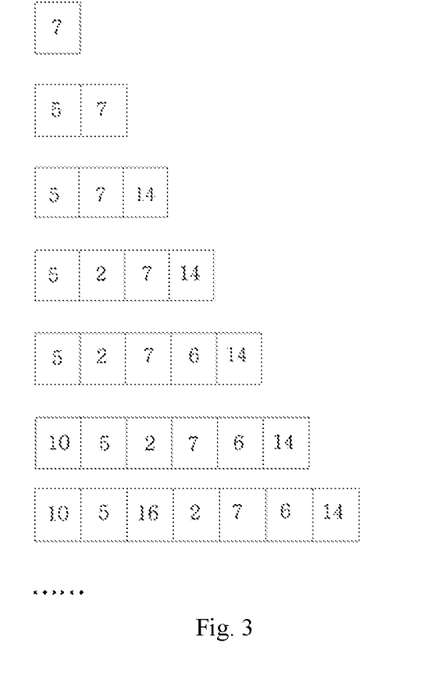
FIG. 3 illustrates a schematic diagram of a process of generating an unordered list according to an embodiment of the disclosure.

This embodiment provides a method for generating an unordered list based on an original ordered list. The original ordered list includes 16 elements 1-16, which are located at positions 1-16, respectively.

FIG. 2 illustrates a schematic diagram of a process of acquiring an element in an unordered list according to an embodiment of the disclosure. FIG. 3 illustrates a schematic diagram of a process of generating an unordered list according to an embodiment of the disclosure.

with reference to FIG. 2 to FIG. 3, the method for generating the unordered list includes the following steps.

In step 1, a random position $P_1=7$ is acquired from the ordered list based on a first random function, and an element 7 corresponding to the position 7 is inserted into the unordered list. Here, the sum of all the current elements in the unordered list is sum=1.

In step 2, the element 7 is taken as the first element and is not at the edge position in the ordered list, therefore, a random position $P_2=5$ is acquired from the previous elements 1-6 of the first element 7 in the ordered list based on the first random function. Here, 1 is added to the sum of all the current elements in the unordered list, i.e., sum=2; a random number x=Radom (1,sum) is solved based on a second random function, i.e., x=Radom (1,2), then x=1; and the element 5 corresponding to $P_2=5$ as the second element is inserted into a first position in the unordered list to form the unordered list 5, 7. Here, the sum of all the current elements in the unordered list is sum=2.

A random position $P_3=14$ is acquired based on the first random function from the following elements 8-16 of the first element 7 in the ordered list. Here, 1 is added to the sum of all the current elements in the unordered list, i.e., sum=2; a random number x=Radom (1,sum) is solved based on the second random function, i.e., x=Radom(1,3), then x=3; and the element 15 corresponding to $P_3=14$ as the second element is inserted into a third position in the unordered list to form the unordered list 5, 7, 14. Here, the sum of all the current elements in the unordered list is sum=3.

In step 3, the element 5 is here taken as the first element and is not at the edge position in the ordered list, therefore, a random position $P_4=2$ is acquired from the previous elements 1-4 of the first element 5 in the ordered list based on the first random function. Here, 1 is added to the sum of all the current elements in the unordered list, i.e., sum=4; a random number x=Radom(1,sum) is solved from the unordered list based on the second random function, i.e., x=Radom(1,4), then x=2; and the element 2 corresponding to $P_4=2$ as the second element is inserted into a second position in the unordered list to form the unordered list 5, 2, 7, 14. Here, the sum of all the current elements in the unordered list is sum=4.

A random position P5=6 is acquired based on the first random function from the following elements 6, 8-13, 15 and 16 of the first element 5 in the ordered list. Here, 1 is added to the sum of all the current elements in the unordered list, i.e., sum=5; a random number x=Radom(1,sum) is solved from the unordered list based on the second random function, i.e., x=Radom(1,5), then x=4; and the element 6 corresponding to P5=6 as the second element is inserted into a fourth position in the unordered list to form the unordered list 5, 2, 7, 6, 14. Here, the sum of all the current elements in the unordered list is sum=5.

The element 14 is taken as the first element and is not at the edge position in the ordered list, therefore, a random position P6=10 is acquired from the previous elements 1, 3, 4, and 8-13 of the first element 14 in the ordered list based on the first random function. Here, 1 is added to the sum of all the current elements in the unordered list, i.e., sum=6; a random number x=Radom(1,sum) is solved from the unordered list based on the second random function, i.e., x=Radom(1,6), then x=1; and the element 10 corresponding to P6=10 as the second element is inserted into the first position in the unordered list to form the unordered list 10, 5, 2, 7, 6, 14. Here, the sum of all the current elements in the unordered list is sum=6.

A random position P7=16 is acquired based on the first random function from the following elements 15-16 of the first element 7 in the ordered list. Here, 1 is added to the sum of all the current elements in the unordered list, i.e., sum=7; a random number x=Radom(1,sum) is solved from the unordered list based on the second random function, i.e., x=Radom(1,7), then x=3; and the element 16 corresponding to P7=16 as the second element is inserted into the third position in the unordered list to form the unordered list 10, 5, 16, 2, 7, 6, 14. Here, the sum of all the current elements in the unordered list is sum=7.

In step 4, $P_4=2$, $P_4=5$, $P_4=10$ and $P_4=16$ are taken as the first elements respectively; the second element is continuously acquired from the ordered list in the same fashion as that in steps 2 to 3 and then inserted into the unordered list, and so on in a similar fashion, till the number of the elements in the unordered list is equal to the sum of the elements in the ordered list; and finally, the unordered list is generated.

It should be understood that although the method is described in an order of the steps in the embodiment described above, it should not be understood that the method can be implemented only in the above order of steps. The numbering of the steps in the method is not intended to limit the execution order of these steps, and other steps may be added among respective steps. The execution order of steps 1 to 4 is not specifically defined in the embodiments of the disclosure.

With the method for generating the unordered list in this embodiment, a generation process is simple and fast, and no repeated element appear in the generated unordered list.

Figure 4:
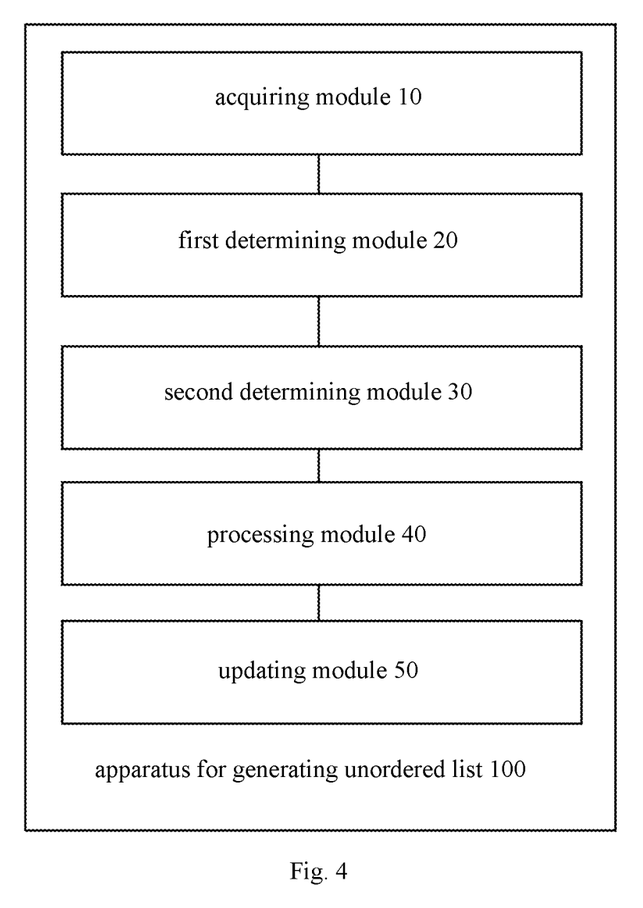
FIG. 4 illustrates a schematic structural diagram of an apparatus for generating an unordered list according to an embodiment of the disclosure.

FIG. 4 illustrates a schematic structural diagram of an apparatus for generating an unordered list according to an embodiment of the disclosure.

With reference to FIG. 4, this embodiment provides an apparatus 100 for generating an unordered list. The apparatus 100 for generating the unordered list includes: an acquiring module 10, a first determining module 20, a second determining module 30, a processing module 40 and an updating module 50. The acquiring module 10 is configured to acquire a first element from an ordered list; the first determining module 20 is configured to determine whether a number of current elements in the unordered list is smaller than a sum of elements in the ordered list; the second determining module 30 is configured to determine, when the number of the current elements in the unordered list is smaller than the sum of the elements in the ordered list, whether a position at which the first element is located is an edge position in the ordered list; the processing module 40 is configured to randomly acquire a second element from the ordered list based on a determining result of the second determining module, randomly acquire a target position from the unordered list, and insert the second element into the target position in the unordered list; and the updating module 50 is configured to, when randomly acquiring the second element from the ordered list based on the determining result of the second determining module is cycled, substitute a position of the second element, that is randomly acquired in a last cycle, in the ordered list with a position of the first element in the ordered list.

The acquiring module 10 acquires the first element from the ordered list; the processing module 30 inserts the first element into the unordered list; the first determining module 20 determines whether the number of the current elements in the unordered list is smaller than the sum of the elements in the ordered list; if the number of the current elements in the unordered list is smaller than the sum of the elements in the ordered list, the second determining module 30 determines whether the position at which the first element is located is the edge position in the ordered list, and the processing module 40 randomly acquire a second element from the ordered list based on the determining result; and the target position is randomly acquired from the unordered list, and the second element is inserted into the target position in the unordered list. The determining module 20, the acquiring module 10 and the processing module repeat the execution of determining whether the number of the current elements in the unordered list is smaller than the sum of the elements in the ordered list, and if the number of the current elements in the unordered list is smaller than the sum of the elements in the ordered list, determine whether the position at which the first element is located is the edge position in the ordered list, and randomly acquire the second element from the ordered list based on the determining result. The target position is randomly acquired from the unordered list; the step of inserting the second element into the target position in the unordered list is performed till the number of the elements in the unordered list is equal to the sum of the elements in the ordered list, wherein when cycling the operation of randomly acquiring the second element from the ordered list based on the determining result of the second determining module, the updating module 50 substitutes the position of the second element, that is randomly acquired in the last cycle, in the ordered list with the position of the first element in the ordered list.

Figure 5:
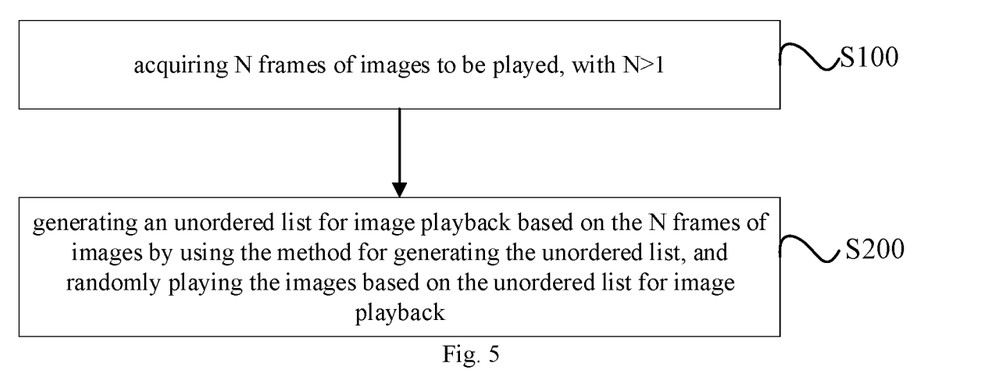
FIG. 5 illustrates a schematic flowchart of a method for managing images according to an embodiment of the disclosure.

This embodiment provides a method for managing images. As illustrated in FIG. 5, the method includes the following steps.

In step S100, N frames of images to be played are acquired, with N>1.

In step S200, an unordered list for image playback is generated based on the N frames of images by using the method for generating the unordered list as defined in the embodiments above, and the images subjected to random carousel based on the unordered list for image playback. The method includes the following steps.

In step S01, a primary image is randomly acquired from N frames of images to be played, and is inserted into an unordered list for image playback.

In step S02, whether a position at which the primary image is located is an edge position in a sequence of the N frames of images is determined in response to that a number of current elements in the unordered list for image playback is smaller than N, and a secondary image is randomly acquired from the N frames of images based on a determining result.

In step S03, a target position is randomly acquired from the unordered list for image playback, and the secondary image is inserted into the target position in the unordered list for image playback.

In step S04, the first element in the foregoing three steps is substituted with the inserted second element; the foregoing three steps are cyclically executed till the number of the images in the unordered list for image playback is equal to the sum of the images in the sequence of the N frames of images, wherein whether the position at which the primary image is located is the edge position in the sequence of N frames of images is determined during the cyclic execution, and a position of the secondary image randomly acquired last time is taken as the position of the primary image.

For the details, a reference may be made to the method for generating the unordered list as described in the embodiments described above, which is not repeated here anymore.

Figure 6:
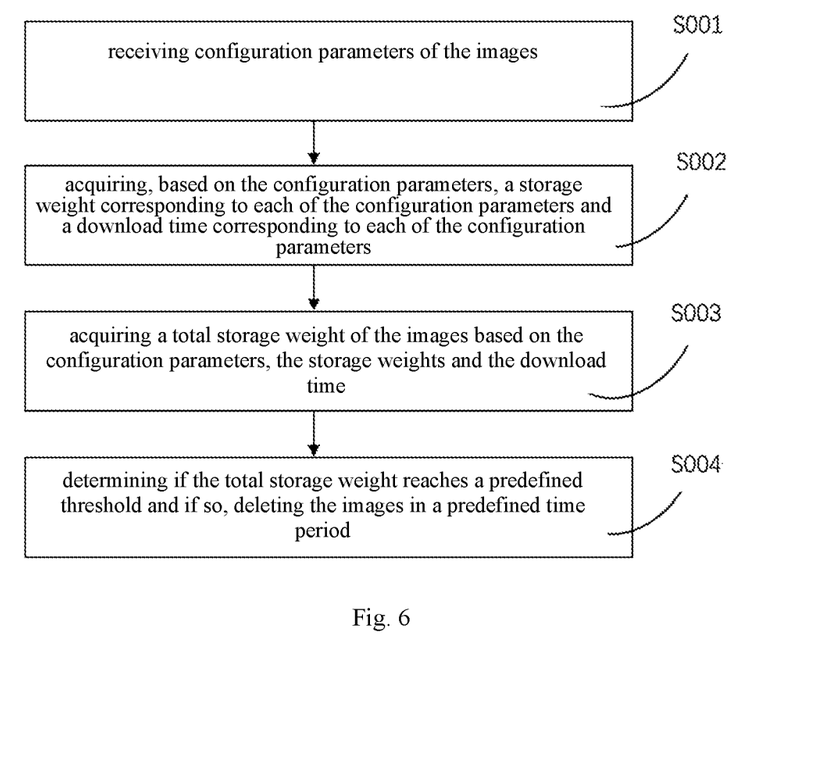
FIG. 6 illustrates a schematic flowchart of an operation of automatically deleting an image according to an embodiment of the disclosure.

FIG. 6 illustrates a schematic flowchart of an operation of automatically deleting an image according to an embodiment of the disclosure.

With reference to FIG. 6 the method for managing the images further includes an operation of performing automatic deletion on the images. The operation of automatic deletion includes the following steps.

In step S001, configuration parameters of the images are received. A user selects the configuration parameters on a setting page on his/her own, and a terminal device receives the configuration parameters of the images. Optionally, the configuration parameters may include at least one of: images downloaded by a local user, images preferred by the local user, images downloaded by an on-line user, images preferred by the on-line user and images selected by a user. In addition to this, the configuration parameters of the images may further include other types of configuration parameters, the specific types of which are not defined in the disclosure.

In step S002, a storage weight corresponding to each of the configuration parameters and a download time corresponding to each of the configuration parameters are acquired based on the configuration parameters. Image information is saved in a database, in which field attributes of the images with respect to each of the configuration parameters is acquired; and the storage weight of each of the configuration parameters and the download time corresponding to each of the configuration parameters are acquired based on the field attributes.

In step S003, a total storage weight of the images is acquired based on the configuration parameters, the storage weights and the download time. A formula for acquiring the total storage weight of the images based on the configuration parameters, the storage weight and the download time includes:

$$Y(x) = a_1 * X_1/t_1 + a_2 * X_2/t_2 + a_3 * X_3/t_3 + a_4 * X_4/t_4 + a_5 * X_5/t_5 \ldots a_n * X_n/t_n.$$

$Y(x)$ represents the total storage weight; $X_1$, $X_2$, $X_3$, $X_4$, $X_5$, ..., $X_n$ represent each of the configuration parameters respectively; $a_1$, $a_2$, $a_3$, $a_4$, $a_5$, ..., $a_n$, ..., an represent the storage weight corresponding to each of the configuration parameters respectively; $t_1$, $t_2$, $t_3$, $t_4$, $t_5$, ..., $t_n$ represent the download time corresponding to each of the configuration parameters; and n is more than or equal to 1.

In an embodiment, the configuration parameters selected by the user include: a wallpaper $X_1$ downloaded by the local user, a wallpaper $X_2$ preferred by the local user, a wallpaper $X_3$ downloaded by the on-line user, a wallpaper $X_4$ preferred by the on-line user and a wallpaper $X_5$ played by the user; the acquired storage weight corresponding to each of the configuration parameters is $a_1$, $a_2$, $a_3$, $a_4$, and $a_5$; the download time corresponding to each of the configuration parameters is $t_1$, $t_2$, $t_3$, $t_4$, and $t_5$; and based on the formula, the total storage weight of the images is $Y(x) = a_1 * X_1/t_1 + a_2 * X_2/t_2 + a_3 * X_3/t_3 + a_4 * X_4/t_4 + a_5 * X_5/t_5$.

In step S004, the images are deleted in a predefined time period in response to a judgment that the total storage weight reaches a predefined threshold. The total storage weight $Y(x)$ of the images is compared with the predefined threshold, and the images are deleted in a predefined time period if the total storage weight reaches the predefined threshold. In an embodiment, images downloaded recently are high in storage weight and will be always in a saved state; if a certain image is very long in download time, has not been played for a long time and is not a preferred image of the user, with low preference among the on-line users, the storage weight of the image may decrease, and may constantly decrease over time; and if the total weight of the image decrease to a certain threshold $Y(x) = m$ (m is a predefined threshold), this image will be deleted automatically in background.

In addition to this, the user may select to set a certain image to "never delete". Therefore, before acquiring the storage weight corresponding to each of the configuration parameters and the download time corresponding to each of the configuration parameters based on the configuration parameters, the method further includes: the total storage weight of the image is not computed any more in a predefined time in response to the detection whether the image is set to "never delete", and the image will be saved all the time. Optionally, if an excess of images that are set to "never delete" are saved in a local storage space to lead to insufficient memory, an operation of enabling automatic deletion may be enabled for the images set to "never delete". A specific method is the same as the operation method of the automatic deletion described above, the details of which are not repeated herein.

It should be understood that although the method is described in an order of the steps in the embodiment described above, it should not be understood that the method can be implemented only in the above order of steps. The numbering of the steps in the method is not intended to limit the execution order of these steps, and other steps may be added among respective steps. The execution order of steps S001 to S004 is not specifically defined in the embodiments of the disclosure.

In this embodiment, for the operation of automatic deletion in a case where the local storage space is limited, the images may be automatically deleted in the background, and the user does not need to delete less preferred images initiatively, so that image management is more user-friendly and the user may download the images at any time without the problem of failure in download due to insufficient storage space.

This embodiment provides a terminal device, which manages images by using the method for managing the images described in the fourth embodiment, including random carousel and automatic deletion operations for the images.

Optionally, the terminal device may include electronic devices such as a cell phone, a tablet computer or a mobile notebook. In addition to this, the terminal device has diverse types, and the specific types of the terminal device are not defined in the disclosure.

This embodiment provides a display system, including a display device. The display device may include a display panel, a memory and a processor. The display panel is configured to fulfill a display function, including image carousel. The memory stores a computer program therein, wherein the computer program, when executed by the processor, implements the method for generating the unordered list described in the embodiments above and the method for managing the images in the fourth embodiment. It should be understood that the electronic device may further include: an input/output (I/O) interface and a communication component.

The processor is configured to execute all or some of the steps in the method for generating the unordered list described in the embodiments above and in the method for managing the images in the fourth embodiment. The memory is configured to store various types of data. These data may include, for example, instructions of any application or method in the electronic device, and data related to the application.

The processor may be an application specific integrated circuit (ASIC), a digital signal processor (DSP), a programmable logic device (PLD), a field programmable gate array (FPGA), a controller, a micro-controller, a microprocessor or other electronic elements for executing the method for generating the unordered list in the embodiments above and in the method for managing the images in the fourth embodiment.

The memory may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

Figure 7:
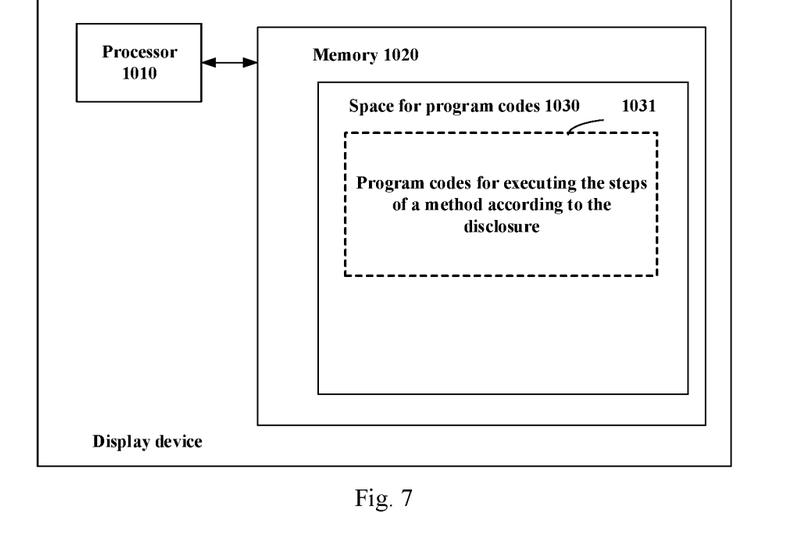
FIG. 7 illustrates schematically a block diagram of a display device for executing the method according to the disclosure.
Figure 8:
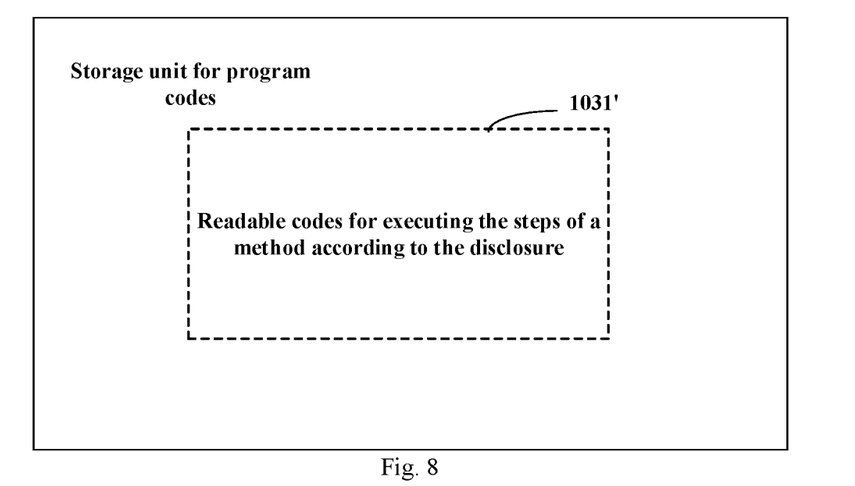
FIG. 8 illustrates schematically a storage unit for maintaining or carrying a program code for implementing the method according to the disclosure.

For example, FIG. 7 illustrates a display device for implementing the method according to the disclosure. Traditionally, the display device includes a processor 1010 and a computer program product or computer-readable medium in the form of a memory 1020. The memory 1020 may be an electronic memory such as a flash memory, an EEPROM, an EPROM, a hard disk or an ROM. The memory 1020 includes a storage space 1030 for program codes 1031 configured to execute any method step in the methods described above. For example, the storage space 1030 may include respective program codes 1031 for implementing respective steps in the methods above respectively. These program codes may be read from or written in one or more computer program products. These computer program products include program code carriers such as a hard disk, a compact disk, a memory card or a floppy disk. Such computer program products are generally portable or fixed storage units as described with reference to FIG. 8. The storage units may include storage segments, storage spaces and the like arranged similar to the memory 1020 in the display device in FIG. 7. The program codes may be compacted for example in an appropriate fashion. In general, the storage unit includes computer-readable codes 1031', i.e., the codes readable by processors, for example, such as 1010. These codes, when executed by the display device, cause the display device to execute each step in the method described above.

This embodiment further provides a computer-readable storage medium. The functional units in respective embodiments in the disclosure may be integrated in a processing unit, or each unit may exist along physically, or two or more units may be integrated in one unit. The function, if implemented as a software function unit or sold or used as a separate product, may be stored in a computer-readable storage medium.

Based on such an understanding, the essential part of the technical solutions in the disclosure or the contribution made by the technical solutions to the prior art or part of the technical solutions may take the form of a software product. The computer software product may be stored in a computer-readable storage medium, and includes a plurality of instructions allowing a computer device (which may be a personal computer, a server, or a network device and the like) to execute all or some of the steps of the methods described in each embodiment of the disclosure.

The foregoing storage medium include various media capable of storing program check codes, such as a flash memory, a hard disk, a multi-media card, a cassette storage (SD or DX storages), a random-access memory (RAM), a static random-access memory (SRAM), a read-only memory (ROM), a magnetic memory, a magnetic disk, an optical disk, a server and an APP store. These media store computer programs therein, and the computer programs when executed by the processor may implement the following method steps.

In step S1, a first element is randomly acquired from an ordered list, and the first element is inserted into the unordered list.

In step S2, whether a position at which the first element is located is an edge position in the ordered list is determined based on the fact that the number of the current elements in the unordered list is smaller than a sum of the elements in the ordered list; and a second element is randomly acquired from the ordered list based on a determining result.

In step S3, a target position is randomly acquired from the unordered list, and the second element is inserted into the target position in the unordered list.

In step S4, the first element in the foregoing three steps is substituted with the inserted second element; the foregoing three steps are cyclically executed till the number of the elements in the unordered list is equal to the sum of the elements in the ordered list, wherein whether the position at which the first element is located is the edge position in the ordered list is determined during the cyclic executing; and a position of the second element randomly acquired last time is taken as the position of the first element.

For specific embodiments and effects produced thereby, a reference may be made to the descriptions in the embodiments described above, the details of which will not be repeated herein.

It should be understood that although the method is described in an order of the steps in the embodiment described above, it should not be understood that the method can be implemented only in the above order of steps. The numbering of the steps in the method is not intended to limit the execution order of these steps, and other steps may be added among respective steps. The execution order of steps S1 to S4 is not specifically defined in the embodiments of the disclosure.

Those ordinarily skilled in the art may readily appreciate that the units and algorithm steps in each example described in combination with the embodiments disclosed herein may be implemented in electronic hardware or a combination of computer software and electronic hardware. Whether these functions are executed in a form of hardware or software depends on the specific application of the technical solution and design constraints. Those skilled in the art may implement the described functions by using different methods for each specific application, but such implementation should not be construed as going beyond the scope of the disclosure. A person skilled in the art may clearly understand that for the convenience and brevity of the description, a reference may be made to the corresponding processes in the forgoing method embodiments for the specific working processes of the system, apparatus and unit as described above, the details of which will not be repeated herein.

In several embodiments provided by the disclosure, it should be understood that the disclosed apparatus, device and method may be implemented in other forms. The apparatus embodiments described above are merely illustrative. The division of the modules is only a logical function division, and there may be other division manners during actual implementation, for example, a plurality of units or components may be combined or may be integrated into another system, or some features may be ignored or not executed. For another point, the mutual coupling or direct coupling or communication connection as shown or discussed may be indirect coupling or communication connection enabled via some interfaces, apparatuses or units, and may be in electrical, mechanical or other forms. A unit described as a separate part may be or may be not physically separated, and a part displayed as a unit may be or may be not a physical unit, which may be located in one place, or distributed on a plurality of network units. Some or all of the units may be selected according to actual requirements to achieve the object of the solutions of the embodiments.

The basic principles of the disclosure are described above in combination with specific embodiments. However, it should be noted that the advantages, benefits, effects and the like mentioned in the disclosure are merely for an illustrative purpose rather than a limiting purpose, and should not be considered as required for each embodiment of the disclosure. In addition, the specific details of the disclosure above are merely for an illustrative purpose to facilitate the understanding, rather than for a limiting purpose, and the details described above are not intended to limit the disclosure as being implemented necessarily by using the specific details described above.

The block diagrams of the means, apparatuses and devices involved in the disclosure are merely illustrative examples and are not intended to require or imply that connections, arrangements and configurations must be performed in a fashion shown in the block diagrams. Those skilled in the art will appreciate that these means, apparatuses, devices and systems may be connected, arranged and configured in any way.

It should also be noted that in the apparatus, device and method of the disclosure, all the components or steps may be broken down and/or recombined. Such a breakdown and/or recombination should be construed as equivalent solutions of the disclosure.

The above description of the disclosed aspects is provided to enable any person skilled in the art to make or use the disclosure. Various modifications to these aspects are apparent to those skilled in the art, and the general principles defined herein can be applied to other aspects without departing from the scope of the disclosure. Therefore, the disclosure is not intended to be limited to the aspects shown herein, but cover the widest scope consistent with the principles and novel features disclosed herein.

In the description of the disclosure, unless otherwise clearly specified, "a plurality of" means at least two, for example, two, three, etc. All directional indications (such as, up, down, left, right, front, back, top, bottom . . . ) in the embodiments of the disclosure only serve to explain a relative positional relationship, a motion condition and the like between various components under a specific posture (as shown in the accompanying drawings). If the specific posture changes, the directional indications change therewith accordingly. Furthermore, the terms "include" and "have" and any variations thereof are intended to cover non-exclusive inclusions. For example, a process, method, system, product or device including a series of steps or units is defined by the listed steps or units, but optionally further includes unlisted steps or units, or optionally further includes other steps or units inherent to said process, method, product or device.

In addition, the "embodiment" mentioned herein means that a specific feature, structure or property described in combination with the embodiment may be included in at least one embodiment of the disclosure. The appearance of this term in various places of the specification neither necessarily refers to the same embodiment, nor refers to independent or alternative embodiments mutually exclusive with other embodiments. A person skilled in the art should explicitly and implicitly understand that the embodiments described herein may be combined with other embodiments.

The above description is only the specific embodiments of the disclosure, and the protection scope of the disclosure is not limited thereto. Any changes or replacements easily conceivable by a person skilled in the art within the technical scope of the disclosure should be included within the protection scope of the disclosure. Therefore, the protection scope of the disclosure should be subjected to the protection scope of the claims. Described above are merely preferred embodiments of the disclosure, which are not intended to limit the disclosure. Any modifications, equivalent substitutions, improvements and the like made within the spirit and principle of the disclosure shall fall within the protection scope of the disclosure.

Described above are merely preferred embodiments of the disclosure, which are not intended to limit the disclosure. Any modifications, equivalent substitutions, improvements and the like made within the spirit and principle of the disclosure shall fall within the protection scope of the disclosure.

The invention claimed is:

1. A method for managing images, comprising:
acquiring N frames of images to be played, with N>1; and
generating an unordered list for image playback based on the N frames of images, and randomly playing the images based on the unordered list for image playback;

wherein the unordered list is generated by:
randomly acquiring a first element from an ordered list and inserting the first element into the unordered list;
cycling the execution of the following steps in a case where a number of current elements in the unordered list is smaller than a sum of elements in the ordered list:
determining whether a position at which the first element is located is an edge position in the ordered list and randomly acquiring a second element from the ordered list based on a result of the determining;
randomly acquiring a target position from the unordered list, and inserting the second element into the target position in the unordered list; and
ending the cyclic execution in a case where the number of the elements in the unordered list is equal to the sum of the elements in the ordered list, wherein when determining whether the position where the first element is located is the edge position in the ordered list during the cyclical executing, a position, at which the second element is located in the ordered list and which is randomly acquired last time, is taken as the position at which the first element is located in the ordered list;
wherein the step of determining whether the position at which the first element is located is the edge position in the ordered list and randomly acquiring the second element from the ordered list based on the result of the determining comprises:
determining whether the position at which the first element is located is the edge position in the ordered list, and if the position at which the first element is located is not the edge position in the ordered list, acquiring two second elements respectively from the ordered list before and after the first element by using a recursive algorithm, wherein the two second elements are located between a previous element of the first element in the ordered list and the first element in the ordered list and between a next element of the first element and a last element in the ordered list, respectively;
or
determining whether the position at which the first element is located is the edge position in the ordered list, and if the position at which the first element is located is the edge position in the ordered list, acquiring one second element from the ordered list,
wherein when the first element is located at a first element position in the ordered list, the second element is acquired between a last element in the ordered list and a next element of the first element; or
when the first element is located at a last element position in the ordered list, the second element is acquired between the first element in the ordered list and a previous element of the first element;
wherein the method further comprises an operation of performing automatic deletion on the images, wherein the operation of automatic deletion comprises: receiving configuration parameters of the images;
acquiring, based on the configuration parameters, a storage weight corresponding to each of the configuration parameters and a download time corresponding to each of the configuration parameters;
acquiring a total storage weight of the images based on the configuration parameters, the storage weight and the download time; and
deleting the images in a predefined time period in response to the total storage weight reaching a predefined threshold.

2. The method for managing the images according to claim 1, wherein the configuration parameters comprise at least one of: images downloaded by a local user, images preferred by the local user, images downloaded by an on-line user, images preferred by the on-line user and images selected by a user.

3. The method for managing the images according to claim 1, wherein acquiring, based on the configuration parameters, the storage weight corresponding to each of the configuration parameters and the download time corresponding to each of the configuration parameters comprises: acquiring a field attribute of each of the configuration parameters, and acquiring, based on the field attributes, the storage weight corresponding to each of the configuration parameters and the download time corresponding to each of the configuration parameters.

4. The method for managing the images according to claim 1, wherein acquiring the total storage weight of the images based on the configuration parameters, the storage weights and the download time comprises: computing the total storage weight of the images by the following formula:

$$Y(x)=a_1*X_1/t_1+a_2*X_2/t_2+a_3*X_3/t_3+a_4*X_4/t_4+a_5*X_5/t_5 \ldots a_n*X_n/t_n,$$

wherein $Y(x)$ represents the total storage weight; $X_1, X_2, X_3, X_4, X_5, \ldots, X_n$ represent each of the configuration parameters respectively; $a_1, a_2, a_3, a_4, a_5, \ldots, a_n$ represent the storage weight corresponding to each of the configuration parameters respectively; $t_1, t_2, t_3, t_4, t_5, \ldots, t_n$ represent the download time corresponding to each of the configuration parameters; and n is more than or equal to 1.

5. The method for managing the images according to claim 1, wherein before acquiring, based on the configuration parameters, the storage weight corresponding to each of the configuration parameters and the download time corresponding to each of the configuration parameters, the method further comprises:
no longer computing the total storage weight within a predefined time in response to detecting that the images are set to "never delete".

6. A terminal device, comprising a memory and a processor, wherein the memory is configured to store one or more computer instructions, wherein the one or more computer instructions are executed by the processor to implement the method for managing the images according to claim 1 for image management.

7. A display system, comprising a display device, wherein the display device comprises a display panel, a memory and a processor; and the memory is configured to store one or more computer instructions, wherein the one or more computer instructions, when executed by the processor, implement the method for managing the images according to claim 1.

8. A computer-readable storage medium storing a computer program therein, wherein the computer program, when executed by a processor, implements the method for managing the images according to claim 1.

* * * * *